United States Patent [19]

Sakashita et al.

[11] Patent Number: 5,488,526
[45] Date of Patent: Jan. 30, 1996

[54] DISK DRIVE DEVICE HAVING A SPINDLE MOTOR AND A HEAD CARRIAGE SECTION BOTH PROVIDED IN A DISK CASSETTE LOADING AREA

[75] Inventors: Hiroshi Sakashita; Eiji Arasaki, both of Nagano, Japan

[73] Assignee: Kabushiki Kaisha Sankyo Seiki Seisakusho, Tokyo, Japan

[21] Appl. No.: 221,786

[22] Filed: Apr. 1, 1994

[30] Foreign Application Priority Data

Apr. 1, 1993 [JP] Japan .................................. 5-098626

[51] Int. Cl.⁶ .................................................. G11B 5/55
[52] U.S. Cl. ........................................ 360/106; 360/99.02
[58] Field of Search ................................ 360/106, 97.01, 360/99.01, 99.02, 99.06

[56] References Cited

U.S. PATENT DOCUMENTS

| | | | |
|---|---|---|---|
| 4,774,613 | 9/1988 | Okita | 360/106 |
| 4,819,106 | 4/1989 | Ueda | 360/106 |
| 5,060,101 | 10/1991 | Isomura | 360/106 |

*Primary Examiner*—A. J. Heinz
*Attorney, Agent, or Firm*—Sughrue, Mion, Zinn, Macpeak & Seas

[57] ABSTRACT

An object of this invention is to provide a disk driving device which is small in the number of components, simple in structure, and low in manufacturing cost, and which can be miniaturized. In a disk driving device, a spindle motor and a head carriage section are provided in a disk cassette loading area, and the guide mechanism of the head carriage section is provided beside the spindle motor. The object of the invention has been achieved by arranging the spindle motor and the head carriage section collectively in the disk cassette loading area. Preferably, the spindle motor and the head carriage section are arranged on one and the same circuit board.

10 Claims, 3 Drawing Sheets

5,488,526

DISK DRIVE DEVICE HAVING A SPINDLE MOTOR AND A HEAD CARRIAGE SECTION BOTH PROVIDED IN A DISK CASSETTE LOADING AREA

BACKGROUND OF THE INVENTION

1. Field of the Invention

This invention relates to a disk driving device for recording data signals on magnetic disks, optical disks, etc. and reproducing data signals therefrom.

2. Related Art

In a conventional disk driving device for recording data signals on magnetic disks, optical disks, etc. and reproducing data signals therefrom, a spindle motor and a head carriage section are provided individually, and the spindle motor and the head carriage section are incorporated in the device in an assembling step. FIG. 9 shows a conventional 3.5-inch floppy disk driving device of this type. As shown in FIG. 9, a disk driving device body, namely, a chassis 41 has a disk inserting window along the right edge, into which a disk cassette is inserted in the direction of the arrow, thus being loaded therein. The first half of the chassis 41 in the direction of insertion of the disk cassette, i.e., the right half of the chassis 41, is a disk cassette loading section, in which a motor driving circuit board 42 is fixedly secured. A disk driving device controlling circuit board 55 is fixedly mounted on the left half of the chassis 41.

A spindle motor 54 is mounted on the motor driving circuit board 42. The disk hub in the disk cassette is set on the hub stand of the spindle motor 54, so as to permit the rotation of the disk. A head carriage section 43 is provided on the chassis 41 in such a manner that it is laid over the disk driving device controlling circuit board 55. The head carriage section 46 includes: a feed screw 46 which is turned by a stepping motor 45; a guide bar 50; a moving base 57 which is guided by the guide bar 50 and moved linearly by the rotation of the feed screw 46; a head carriage 48 integral with the moving base 57; and a head 49 secured to the head carriage 48. The disk driving device controlling circuit board 55 has a connector 53 at the rear end, which is connected to external circuits.

As is apparent from the above description, the spindle motor 54 and the head carriage section 43 are not overlapped, being arranged in the stated order as viewed from the disk inserting window. The head carriage section 43 is laid over the disk driving device controlling circuit board 55, and the disk driving device controlling circuit 55 and the motor driving circuit board 42 are secured to the chassis 41.

As was described above, in the conventional disk driving device, the spindle motor and the head carriage section are individually mounted through the respective circuit boards on the chassis. Therefore, the conventional disk driving device is large in the number of components, high in component cost, and high in assembling cost. Since the components of the head carriage section are provided above the disk driving device controlling circuit board, it is necessary to have a space above the disk driving device controlling circuit board for the arrangement of the components of the head carriage section, which impedes the miniaturization of the disk driving device.

SUMMARY OF THE INVENTION

Accordingly, an object of this invention is to eliminate the above-described difficulties accompanying a conventional disk driving device. More specifically, an object of the invention is to provide a disk driving device which is simple in structure, and low in manufacturing cost, and which can be miniaturized.

The disk driving device of the invention comprises: a chassis; a spindle motor and a head carriage mechanism provided in a disk cassette loading area of the chassis; and a guide mechanism of the head carriage mechanism arranged beside the spindle motor as viewed in the direction of insertion of a disk cassette.

Preferably, in the disk driving device, the spindle motor and the head carriage section are arranged on one and the same circuit board.

In the disk driving device of the invention, the guide mechanism of the head carriage section is provided beside the spindle motor, and therefore the spindle motor and the head carriage section are arranged collectively in the disk cassette loading area. By arranging the spindle motor and the head carriage on one and the same circuit board, the disk driving device is reduced in depth.

DETAILED DESCRIPTION OF THE PREFERRED EMBODIMENTS

Disk driving devices, which constitute embodiments of this invention, will be described with reference to the accompanying drawings. Those devices are 3.5-inch floppy disk driving devices.

Figure 1:
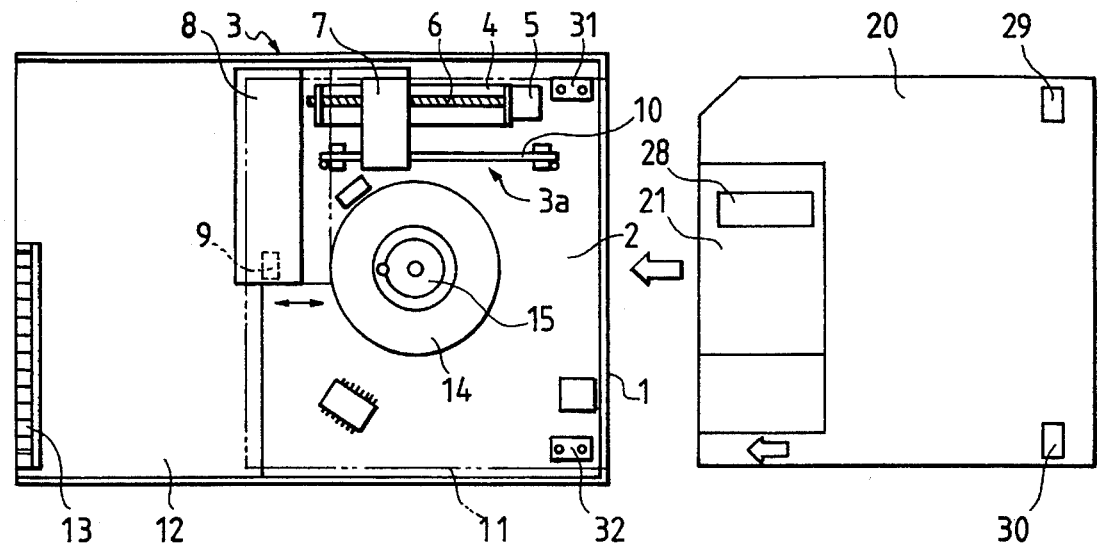
FIGS. 1 and 2 are a plan view and a side view, respectively, showing an example of a disk driving device, which constitutes a first embodiment of the present invention.

In FIG. 1 showing a first embodiment of the invention, reference numeral 20 designates a 3.5-inch floppy disk cassette. The floppy disk cassette incorporates a flexible disk in such a manner that it is rotatable, and a shutter 21 having a head inserting window 28 is slidably provided along the front edge (the left edge in FIG. 1) of the disk cassette 20, and a disk discriminating hole 29 and a write protect hole 30 are formed in the disk cassette; more specifically, they are located at both ends of the rear end portion of the disk cassette 20.

Figure 2:
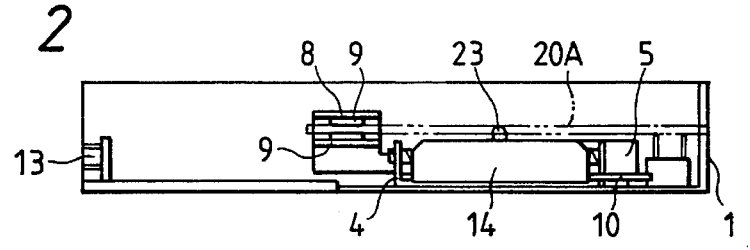
Figure 3:
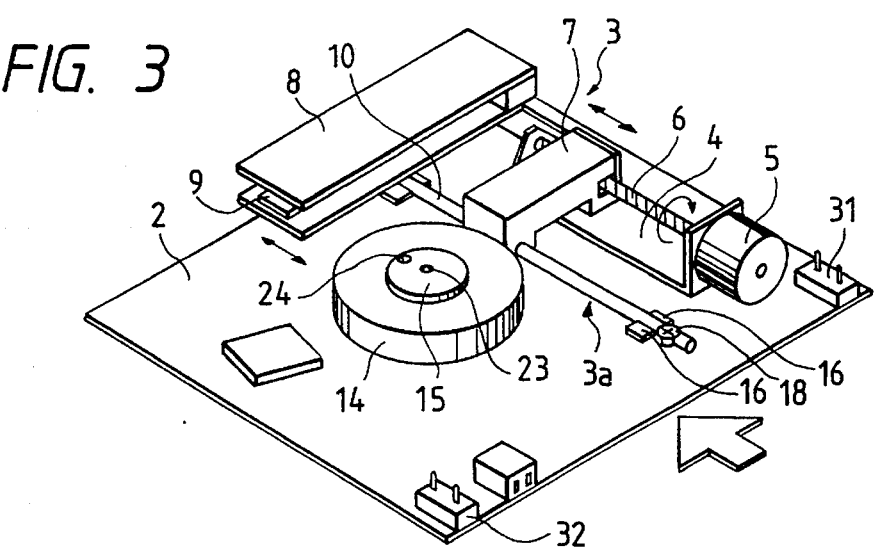
FIG. 3 is a perspective view showing essential components of the first embodiment of the present invention.

In FIGS. 1 through 3, a disk driving device body, namely, a chassis 1 has a disk inserting window along the right end, in which the disk cassette is inserted in the direction of the arrow, thus being loaded therein. The first half of the chassis 1 as viewed in the direction of insertion of the disk cassette, i.e., the right half of the chassis 1, is a disk cassette loading area 11, in which a motor driving circuit board 2 is fixedly secured, which circuit board 2 also serves as a board for mounting a head carriage section 3. A disk driving device controlling circuit board 12 is fixedly mounted on the left half of the chassis 1. The disk driving device controlling circuit board 12 has a connector 13 at the rear edge which is connected to external circuits. The disk driving device controlling circuit may be eliminated by forming a disk driving device controlling circuit on the motor driving circuit board 2.

A spindle motor 14 is mounted on the motor driving circuit board 2. The disk hub in the disk cassette 20 is set on the hub stand 15 of the spindle motor 14, so that the disk is turned. The head carriage section 3, similarly as in the case of the conventional one, comprises: a feed screw 6 which is rotated by a stepping motor 5; a guide bar 10; a moving base 7 which is guided by the guide bar 10 and moved linearly by the rotation of the feed screw 6; a head carriage 8 integral with the moving base 7; and a head 9 secured to the head carriage 8. The head carriage section 3 comprising the above-described components, together with the spindle motor 14, is arranged on the motor driving circuit board 2 which is secured in the disk cassette loading area 11; that is, the spindle motor 14 and the head carriage section 3 are arranged in the disk cassette loading area 11. In order to obtain a space for arranging the head carriage section, it is preferable to employ a spindle motor which is smaller in diameter.

In the head carriage section 3, the guide bar 10, the feed screw 6, and the moving base 7 form a guide mechanism 3a, which is arranged on one side of the spindle motor 14 as viewed in the direction of insertion of the disk cassette 20. The guide bar 10 and the feed screw 6 are extended in the direction of insertion of the disk cassette 20, while the head carriage 8 integral with the moving base 7 is extended perpendicular to the direction of insertion of the disk cassette 20, and the head 9 secured to the end of the head carriage 8 is located behind the spindle motor 14. Push switches 31 and 32 for detecting the disk discriminating hole 29 and the write protect hole 30 of the disk cassette 20 are provided on the chassis 1; more specifically, they are located at both ends of the front edge portion of the chassis 1, respectively.

Figure 4:
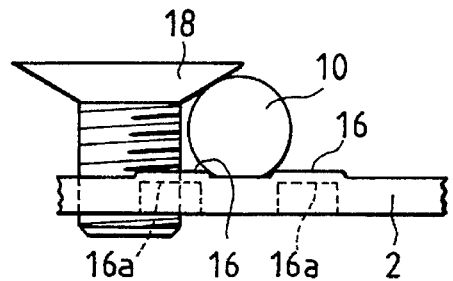
FIG. 4 is a front view showing a guide bar mounting structure in the first embodiment of the present invention.
Figure 5:
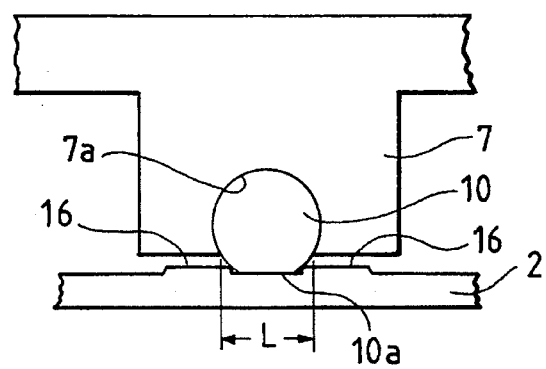
FIG. 5 is a front view showing relationships between the guide bar and a moving base in the first embodiment of the present invention.

The mounting structure of the aforementioned guide bar 10 is as shown in FIGS. 4 and 5. The motor driving circuit board 2 is formed as follows: An insulating layer is formed on a metal plate such as an iron plate, and a predetermined circuit pattern is formed, for instance, by etching. However, it should be noted that no circuit pattern is formed in the region of the circuit board 2 where the guide bar 10 is arranged. The circuit board 2 has two pairs of flat protrusion 16 on both sides of the two ends of the guide bar 10, which are formed by pressing the circuit board 2 from the lower surface. In FIG. 4, reference character 16a designates recesses which are formed when the protrusions 16 are formed in the above-described manner. The guide bar 10 is circular in section, and it is mounted directly on the circuit board 2; however, it should be noted that the surface of the guide bar 10 which is brought into contact with the circuit board 2 is made flat so that it is held stable on the board 2. Each of the two end portions of the guide bar 10 is set between the respective pair of protrusions 16 and 16, and pushed downwardly with the head of a flat head bolt 18 screwed into the circuit board 2. Thus, the guide bar 10 is fixedly secured onto the circuit board 2. The protrusions 16 may be formed additionally on both sides of the middle portion of the guide part. Alternatively, the protrusions 16 may be so modified that they are extended to cover the whole length of the guide bar 10.

The moving base 7, which is moved along the guide bar 10, has a guide hole 7a as shown in FIG. 5 which is engaged with the guide bar 10; in other words, the moving base 7 is mounted through the guide hole 7a on the guide bar 10. In order to prevent the interference of the moving base with the circuit board 2, the guide hole 7a is shaped as follows: The guide hole 7a, being partially cut by the lower surface of the moving base 7, is substantially arcuate in section, so that it is opened in the lower surface of the moving base 7, and therefore the lower surface of the moving base 7 mounted through the guide hole 7a on the guide bar 10 is suitably spaced from the circuit board 2. The width L of the opening of the guide hole 7a is smaller than the diameter of the guide bar 10, so as to prevent the moving base 7 from coming off the guide bar 10. The moving base 7 may be made of a material such as metal, resin or ceramic.

In the conventional disk driving device, the chassis is partially cut and raised to support the guide bar, and the latter is inserted into the guide hole of the moving base by using fixing means. Hence, the distance between the upper surface of the chassis and the upper surface of the moving base is unavoidably large, which impedes the reduction in thickness of the disk driving device. This difficulty is eliminated by the invention. That is, in the disk driving device of the invention, as was described above the moving base 7 is engaged through the guide substantially arcuate in section with the guide bar 10 which is set in close contact with the upper surface of the circuit board 2, which reduces the distance between the upper surface of the circuit board 2 and the upper surface of the moving base 7; that is, the disk driving device is reduced in thickness. Furthermore, the fixing structure of the guide bar is simple, and therefore in the disk driving device of the invention, the number of components is reduced as much.

The operation of the above-described disk driving device will be described.

Figure 6A:
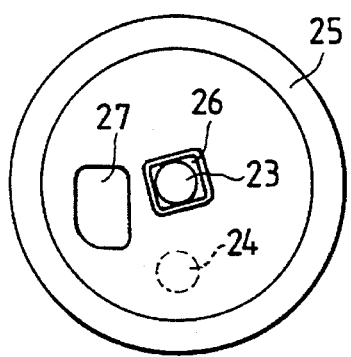
FIGS. 6 (a), (b) and (c) are plan views for a description of the chucking operation of a disk hub in the first embodiment.
Figure 6B:
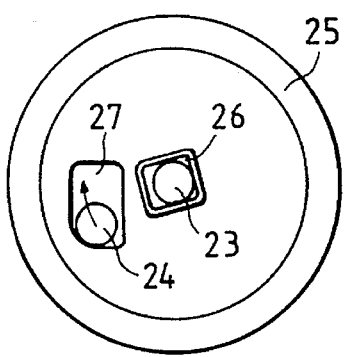
Figure 6C:
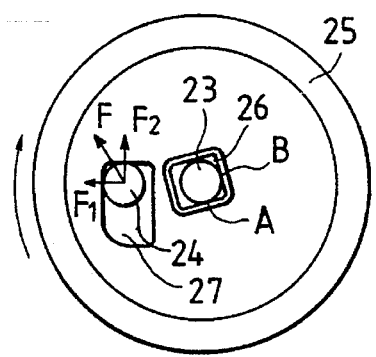

As shown in FIG. 1, when the disk cassette 20 is loaded in place by being inserted through the disk inserting window, the disk cassette 20 is positioned over the circuit board 2, and the disk hub is set on the hub stand 15. The disk hub thus set is attracted by a chucking magnet on the hub stand, so that, as shown in FIG. 6 (a), the spindle 23 of the motor 14 is engaged with the spindle engaging hole 26 of the disk hub 25. When, as shown in FIG. 6 (b), a drive pin 24 on the hub stand 15 comes to the engaging hole 27 of the disk hub 25 while the hub stand 15 is being turned clockwise, the drive pin 24 goes into the engaging hole 27. When the hub stand 15 is further turned, as shown in FIG. 6 (c) the spindle 23 and the engaging hole 26 are abutted against each other at a predetermined position while the drive pin 24 and the engaging hole 27 are also abutted against each other at a predetermined position. Thus, as is well known in the art, the disk hub 25 is positioned on the hub stand 15, and turned.

In recording data signals on the disk, or reproducing data signal therefrom, the head 9 is inserted into the disk cassette 20 through the head inserting window 28 of the shutter 21 so that it is confronted with the disk. Under this condition, the stepping motor 5 is operated to drive the feed screw 6, so that the moving base 7 is linearly moved while being guided by the guide bar 10. As a result, the head 9 secured to the head carriage 8, which is integral with the guide bar 10, is moved radially of relative to the disk until it is aimed at the appropriate track, to start the data signal recording or reproducing operation.

In the above-described disk driving device, the motor driving circuit board 2 is fixedly provided in the disk cassette loading area 11, and the spindle motor 14 and the head carriage section 3 are arranged on the motor driving circuit board 2, and the guide mechanism 3a of the head carriage section 3 is arranged beside the spindle motor 14.

Therefore, in the disk driving device, unlike the conventional one, it is unnecessary to mount the spindle motor and the head carriage section individually on the chassis, which contributes to reduction of the number of components. The spindle motor with the hub stand 15, and the head 9 are mounted on one and the same circuit board, namely, the motor driving circuit board 2. Hence, the relative position of the head 9 and the hub stand 15 can be adjusted with ease; that is, the assembling work is simplified as much, which contributes to reduction of the manufacturing cost. Furthermore, since the guide mechanism 3a of the head carriage section 3 is provided beside the spindle motor 14, the disk driving device controlling circuit can be formed on the motor driving circuit board; that is, it is unnecessary to provide a disk driving device controlling circuit board in addition to the motor driving circuit board, which makes it possible to reduce the thickness of the disk driving device. Even if the disk driving device controlling circuit board 12 is provided in addition to the motor driving circuit board 2 as shown in FIG. 1, the head carriage section 3 is not laid over the disk driving device controlling circuit board 12. Hence, by arranging the circuit components so that the surface of the circuit board 12 is effectively used, the area of the disk driving device controlling circuit board 12 can be reduced; that is, the disk driving device can be miniaturized as much.

Figure 7:
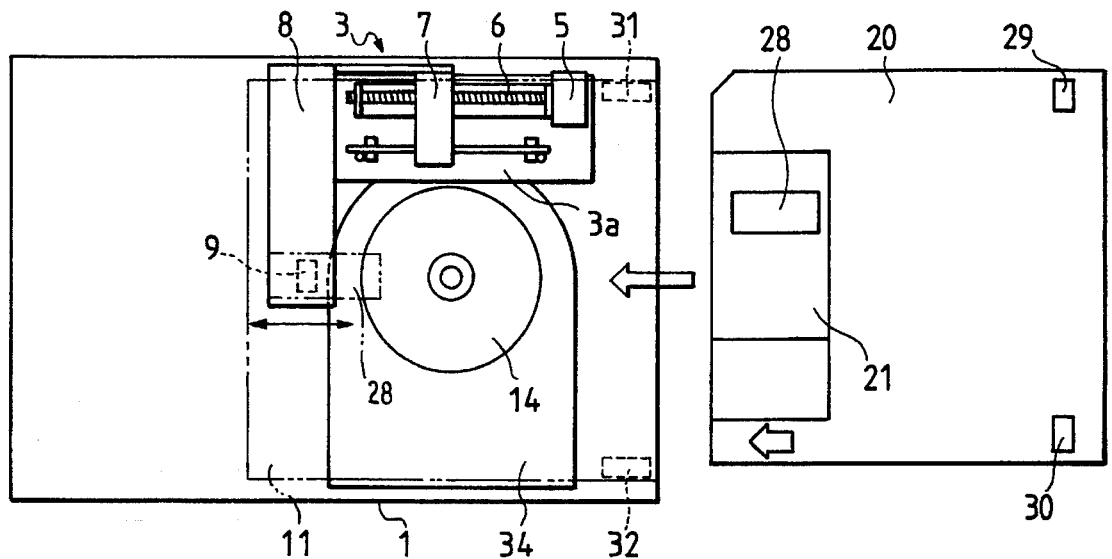
FIGS. 7 and 8 are a plan view and a side view, respectively, showing another example of the disk driving device, which constitutes a second embodiment of the present invention.
Figure 8:
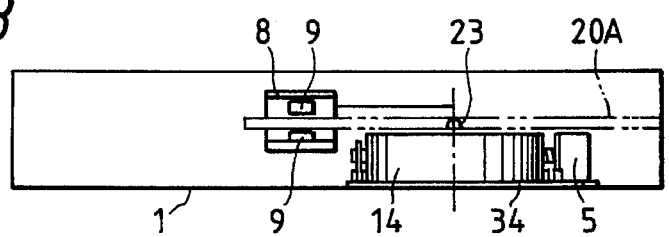
Figure 9:
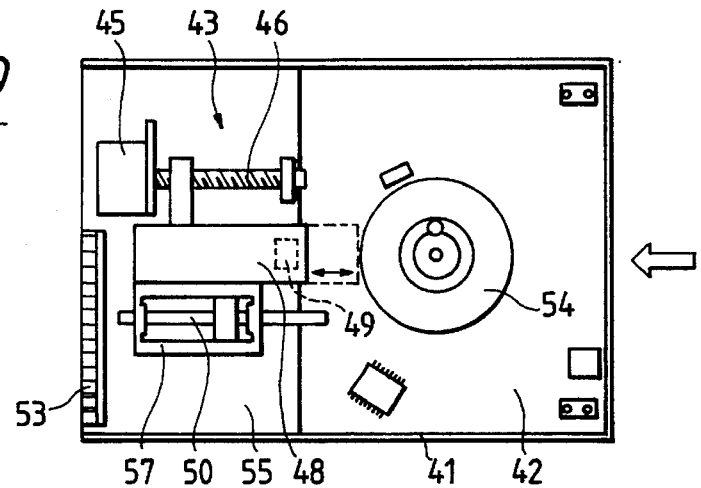
FIG. 9 is a plan view showing an example of a conventional disk driving device.

Another example of the disk driving device, which constitutes a second embodiment of the invention, will be described with reference to FIGS. 7 and 8. The second embodiment is fundamentally the same as the above-described first embodiment. However, the second embodiment is different from the first embodiment in that the spindle motor 14 and the head carriage section 3 are provided on different boards, respectively—the spindle motor 14 is mounted on a motor driving circuit board 34 while the head carriage section 3 is mounted on the chassis 1—and the disk driving device controlling circuit board is combined with the motor driving circuit board 34.

In addition, similarly as in the case of the first embodiment, the spindle motor 14 and the head carriage section 3 are arranged in the disk cassette loading area 11. In FIG. 7, reference numeral 28 designates a head inserting window formed in the disk cassette 20. When the shutter 21 of the disk cassette 20 is slid until its head inserting window 28 is positioned to overlap the head 9, the head 9 is brought into slide contact with the disk in the cassette 20 through the head inserting window 28. The other components of the second embodiment are the same as those of the first embodiment described above; in FIGS. 7 and 8, parts corresponding functionally to those which have been described with reference to the first example of the disk driving device are therefore designated by the same reference numerals or characters. The second embodiment has the same effects or merits as the above-described first embodiment.

In the disk driving device according to the invention, the motor driving circuit board is fixedly provided in the disk cassette loading area, and the guide mechanism of the head carriage section is arranged beside the spindle motor. Hence, the motor driving circuit and the disk driving device controlling circuit can be provided as one unit; that is, it is unnecessary to provide the disk driving device control circuit board in addition to the motor driving circuit board, which contributes to miniaturization of the disk driving device and to reduction of the number of components. Even if the disk driving device controlling circuit board is provided in addition to the motor driving circuit board, the disk driving device controlling circuit board can be provided outside the disk cassette loading area. Therefore, by utilizing the disk driving device controlling circuit boards effectively to arrange the circuit components, the disk driving device controlling circuit can be reduced in area, which contributes to miniaturization of the disk driving device.

What is claimed is:

1. A disk driving device comprising:

a chassis;

a substrate disposed in a disk cassette loading area of said chassis;

a spindle motor including a hub base for mounting a disk cassette; and a head carriage mechanism including a head for recording and reproducing information from the disk cassette, said spindle motor and said head carriage mechanism both being mounted on said substrate disposed in the disk cassette loading area of said chassis, wherein said loading area comprises only the area above the substrate which conforms to the area bounded by the projection of the cassette onto the substrate, said head carriage mechanism comprises a guide mechanism extending in parallel with a cassette insertion direction so as to move the head in a direction parallel with the cassette insertion direction, said guide mechanism being disposed on a side of said spindle motor when viewed in the cassette insertion direction, said guide mechanism being disposed between the disk cassette and said substrate when viewed in the cassette insertion direction.

2. A disk driving device as claimed in claim 1, wherein said substrate comprises a circuit board.

3. A disk driving device as claimed in claim 2, wherein said circuit board is a motor driving circuit board.

4. A disk driving device as claimed in claim 1, wherein said head carriage mechanism further comprises:

a head carriage, the head being provided on an end of said head carriage, said head carriage being disposed so as to extend in a direction perpendicular to the direction of insertion of the disk cassette, said head carriage being moved in a radial direction of the disk cassette mounted on the hub base of said spindle motor so that the head performs one of a data recording and reproducing operation at predetermined radial positions on the disk cassette.

5. A disk driving device as claimed in claim 1, wherein said guide mechanism comprises:

a stepping motor;

a feed screw rotated by said stepping motor;

a moving base coupled with said feed screw and linearly moved by rotation of said feed screw; and a guide bar for guiding the linear movement of said moving base, and wherein said head carriage mechanism comprises a head carriage for supporting the head, said head carriage being integrally formed with said moving base.

6. A disk driving device as claimed in claim 5, wherein said guide bar and said feed screw are both disposed so as to extend in the direction of insertion of the disk cassette, said head carriage is disposed so as to extend in a direction perpendicular to the direction of the insertion of the disk cassette, and wherein the head is disposed behind the spindle motor when viewed in the direction of insertion from a front opening of said disk driving device.

7. A disk driving device as claimed in claim 1, wherein said disk driving device is a floppy disk driving device.

8. A disk driving device as claimed in claim 5, wherein said guide bar is fixed on an upper surface of said substrate, and wherein said moving base has a guide groove in which said guide bar is inserted, said guide groove being open to a lower surface of said moving base, a width of said guide groove at the lower surface of said moving base being less than a maximum diameter of said guide groove and less than a diameter of said guide bar to retain said moving base on said guide bar.

9. A disk driving device as claimed in claim 8, further comprising a plurality of protrusions in said substrate, said guide bar being disposed between said plurality of protrusions, and a flat head screw secured in said substrate, a head of said flat head screw pressing against said guide bar to secure said guide bar between said plurality of protrusions on said substrate.

10. A disk driving device comprising:

a chassis;

a substrate disposed in a disk cassette loading area of said chassis;

a spindle motor including a hub base for mounting a disk cassette; and a head carriage mechanism including a head for recording and reproducing information from the disk cassette, said spindle motor being mounted on said substrate disposed in the disk cassette loading area of said chassis, said head carriage mechanism being mounted on said chassis in the disk cassette loading area of said chassis, wherein said loading area comprises only the area above the substrate which conforms to the area bounded by the projection of the cassette onto the substrate, said head carriage mechanism comprises a guide mechanism extending in parallel with a cassette insertion direction so as to move the head in a direction parallel with the cassette insertion direction, said guide mechanism being disposed on a side of said spindle motor when viewed in the cassette insertion direction, said guide mechanism being disposed between the disk cassette and said substrate when viewed in the cassette insertion direction.

* * * * *